United States Patent
Silva et al.

(10) Patent No.: US 11,010,724 B2
(45) Date of Patent: May 18, 2021

(54) ANALYZING CALENDAR ENTRIES

(71) Applicant: International Business Machines Corporation, Armonk, NY (US)

(72) Inventors: Asima Silva, Holden, MA (US); Richard Gorzela, Billerica, MA (US); Jaime M. Stockton, Acton, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 669 days.

(21) Appl. No.: 15/852,738

(22) Filed: Dec. 22, 2017

(65) Prior Publication Data
US 2019/0197491 A1    Jun. 27, 2019

(51) Int. Cl.
*G06Q 10/10* (2012.01)
*G06F 16/903* (2019.01)
*G06F 16/904* (2019.01)

(52) U.S. Cl.
CPC ....... *G06Q 10/1095* (2013.01); *G06F 16/904* (2019.01); *G06F 16/90335* (2019.01)

(58) Field of Classification Search
CPC .......... G06Q 10/1095; G06F 16/90335; G06F 16/904
See application file for complete search history.

(56) References Cited

U.S. PATENT DOCUMENTS

| | | | |
|---|---|---|---|
| 6,886,002 B2 | 4/2005 | Horvitz | |
| 8,204,521 B2 | 6/2012 | Hardy | |
| 8,631,119 B2 | 1/2014 | Malkin | |
| 9,117,204 B2* | 8/2015 | Hubner | G06Q 10/1093 |
| 9,443,232 B1 | 9/2016 | Silva | |
| 2013/0232150 A1* | 9/2013 | Gingras | G06F 16/285 |
| | | | 707/740 |
| 2014/0122483 A1* | 5/2014 | Zhang | G06Q 50/01 |
| | | | 707/737 |
| 2015/0058058 A1* | 2/2015 | Shi | G06Q 10/1095 |
| | | | 705/7.19 |
| 2015/0154291 A1* | 6/2015 | Shepherd | G06F 16/95 |
| | | | 707/748 |
| 2015/0278730 A1 | 10/2015 | Goldsmith | |

(Continued)

OTHER PUBLICATIONS

B. Schilit et al.; "Context-Aware Computing Applications"; Mobile Computing Systems and Applications; WMCSA 1994; 1995 IEEE; Santa Cruz, California; 6 pages.

(Continued)

*Primary Examiner* — SM A Rahman
(74) *Attorney, Agent, or Firm* — Fabian VanCott; Steven L. Nichols (57) ABSTRACT

A computer-implemented method for analyzing calendar entries may include receiving, at a computing device, at least one calendar entry associated with a calendar application, the calendar entry comprising data defining a meeting type; tracking a user's activity in the meeting type; detecting at least one related calendar entry related with the received calendar entry, wherein the detected related calendar entry comprises a meeting type related to the meeting type of the received calendar entry; and supplementing the related calendar entry with at least one indicator describing the user's activity in the meeting type based on the tracked user activity.

17 Claims, 3 Drawing Sheets

(56) References Cited

U.S. PATENT DOCUMENTS

2017/0209055 A1* 7/2017 Pantelopoulos ... A61B 5/02108

OTHER PUBLICATIONS

T. Erickson et al.; "Socially Translucent Systems: Social Proxies, Persistent Conversation, and the Design of Babble"; Proceedings of CHI '99 ACM Conference on Human Factors in Computing System, May 15-20, 1999 ACM Press; 8 pages.
Anhalt et al., "Toward context-aware computing: experiences and lessons", IEEE Intelligent Systems, May-Jun. 2001, vol. 16, Issue 3, 9 pages.

* cited by examiner

ANALYZING CALENDAR ENTRIES

BACKGROUND

During business operations, organizations may choose to conduct business meetings that may focus on a number of topics that improve performance by some workers or other persons, set goals, and/or coordinate with other workers or persons all in order to build the organization. These meetings may, however, take time out of the person's day and, in some cases, may prevent any given person from actually working. Indeed, these meetings may take up so much of a person's day that the people working with and around them (i.e., team leads/managers and peers) may not realize how much time these persons actually spend active in meetings. Additionally, these team leaders/managers and/or peers may not understand what amount of time these persons actually have available in a work day. Conversely these persons also have a difficult time understanding and sharing their true availability beyond what is displayed on their calendars. Therefore, when looking at calendars, peers don't have a true indication of how engaged that person historically is in any given meeting. Answers to the questions "are they really unavailable?," "do they usually attend that meeting or merely parts of it?," "should they be in the meeting?," "are they multi-tasking while the meeting is going on?" are not knowable to their peers.

SUMMARY

According to one embodiment of the present invention a method may include receiving, at a computing device, at least one calendar entry associated with a calendar application, the calendar entry comprising data defining a meeting type. In an embodiment, the method may further include tracking a user's activity in the meeting type. In an embodiment, the method may also include detecting at least one related calendar entry related with the received calendar entry, wherein the detected related calendar entry comprises a meeting type related to the meeting type of the received calendar entry. In an embodiment, the method may further include supplementing the related calendar entry with at least one indicator describing the user's activity in the meeting type based on the tracked user activity.

BRIEF DESCRIPTION OF THE SEVERAL VIEWS OF THE DRAWINGS

The accompanying drawings illustrate various examples of the principles described herein and are a part of the specification. The illustrated examples do not limit the scope of the claims.

Throughout the drawings, identical reference numbers designate similar, but not necessarily identical, elements.

DETAILED DESCRIPTION

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language indicates that a particular feature, structure, or characteristic described in connection with that example is included as described, but may not be included in other examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

In the present specification and in the appended claims, the term "module" is meant to be understood as program unit that is discrete and identifiable with respect to compiling, combining with other units, and loading. In an example, the modules may be executed by a processor.

Figure 1:
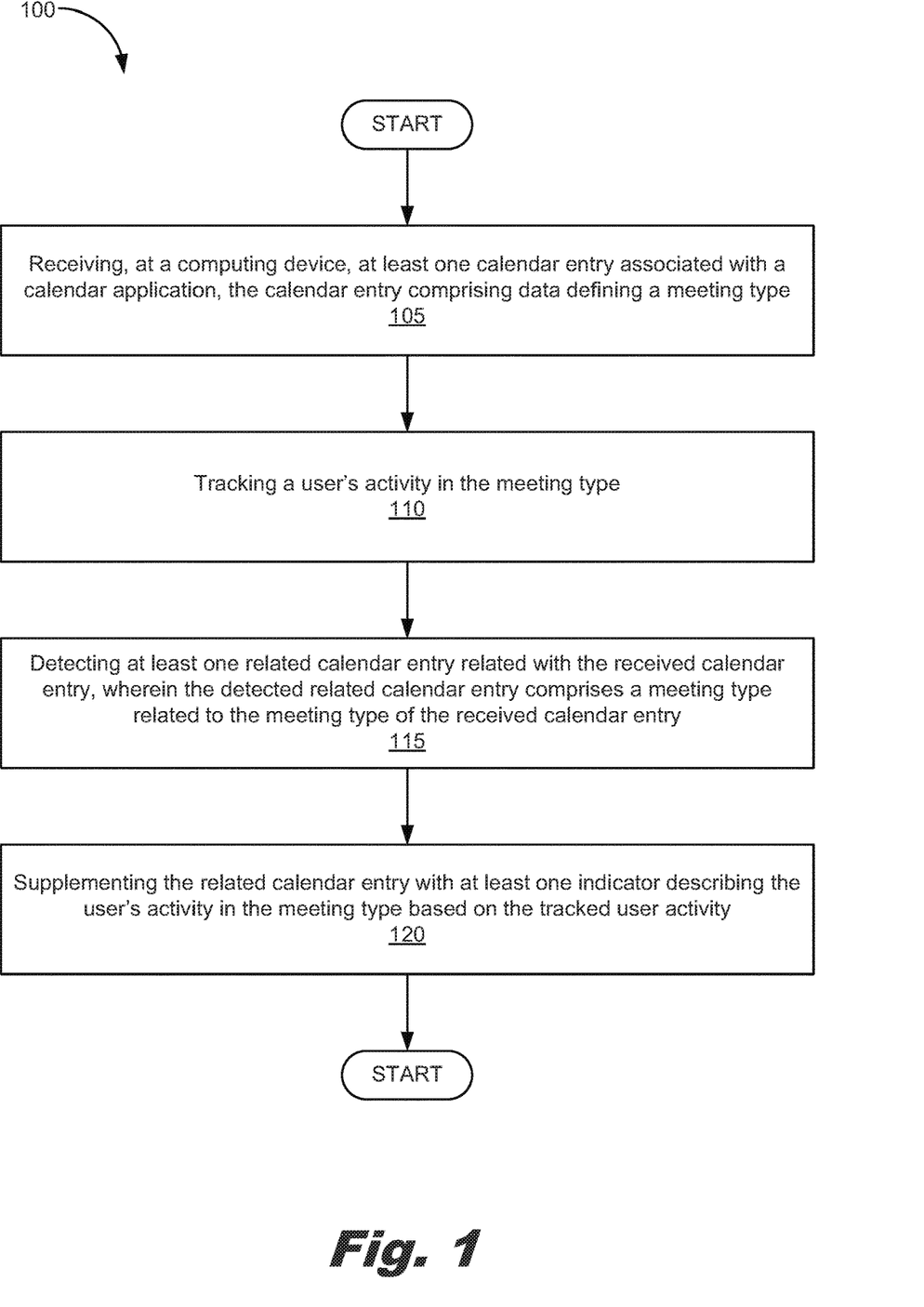
FIG. 1 is a flowchart showing a computer implemented method for analyzing calendar entries according to one example of principles described herein.

Turning now to the figures, FIG. 1 is a flowchart showing a computer implemented method (100) for analyzing calendar entries according to an example of the principles described herein. The method (100) may include receiving (105), at a computing device, at least one calendar entry associated with a calendar application, the calendar entry comprising data defining a meeting type. The computing device may be any type of computing device that can receive data and process that data using a processor. Examples of computing devices include servers, desktop computers, laptop computers, personal digital assistants (PDAs), mobile devices, smartphones, gaming systems, and tablets, among other computing devices.

In this example, the processor may receive data associated with the at least one calendar entry. In an example, the processor may receive the data defining the meeting type associated with the calendar entry. The processor may include the hardware architecture to retrieve executable code from a computer readable storage medium and execute the executable code. The executable code may, when executed by the processor, cause the processor to implement at least the functionality of the method described herein. In the course of executing code, the processor may receive input from and provide output to a number of a number of other remaining hardware units including a number of peripheral device adapters and a number of network adapters.

The method (100) may further include tracking (110) a user's activity in the meeting type. Examples of the user's activity may include how often and when the user talks during the meeting, how often the user attends the meeting, how long the user stays in the meeting, among other types of activities associated with any meeting type. In an example, the tracking (110) may occur during a single instance of a specific type of meeting. In an example, the tracking (110) may occur after a number of instances of a specific type of meeting. The meeting type, in an example, is determined based on keywords and/or a description associated with the received calendar entry. In an example, a keyword and/or description that includes reference to a meeting to be conducted or even the word "meeting" or similar language may be used to track (210) the user's activity in the meeting type. Thus, in this example, any type of meeting may be used to track (210) the user's activity. In an example, certain meeting types may be defined by a user of the computing device in order to obtain specified data regarding specific meeting types. This data may therefore be used as described herein.

The method (100) may further include detecting (115) at least one related calendar entry related with the received calendar entry, wherein the detected (115) related calendar entry comprises a meeting type related to the meeting type of the received calendar entry. As mentioned herein, the specified data regarding specific meeting types may be tracked and additional related calendar entries may be detected (115). These detected related calendar meetings are used to determine, among a plurality of meetings, the user's activity in the meeting type. The method (100) may further include supplementing (120) the related calendar entry with at least one indicator describing the user's activity in the meeting type based on the tracked user activity. Thus, historic activity in a meeting type or any meeting may be used to indicate future activity by the user of the calendaring system. Examples of user activity may include activity that is defined by the user's attendance to the meeting type, points at which the user speaks during the meeting type, an amount of time spent by the user at the meeting type, or combinations thereof. The indicator may therefore, indicate to others in attendance historic activity by the user in that meeting type.

The indicators may be any type of visual aid used to indicate the activity of any user in any meeting type. In an example, the indicator identifies a level of the user's activity in the at least one calendar entry and the at least one detected related calendar entry. In an example, the level of the user's activity is presented by color-coordinating portions of the at least one calendar entry and the detected related calendar entry. In this example, certain colors associated with the meeting defined by the calendar entry may indicate the level of the user's activity in the meeting type.

In an example, the at least one indicator includes a time indicator describing when during the at least one calendar entry and at least one related calendar entry the user is and is not actively engaged in a verbal discussion. In an example, the indicator includes a listening indicator describing that the user is historically in attendance to the meeting type but historically does not engage in the meeting type.

When the related calendar entry is supplemented with the indicators described herein, the user's calendar, complete with at least the calendar entry and the related calendar entry may be accessible to other users and/or user computing devices communicatively coupled to the computing device maintaining the user's calendar. In this way, scheduled meetings may be shown as well as each of the user's indicators as to a historic activity in the meeting type. Over time, the amount of activity (time, discussion, etc.) a user has in any given meeting type or in a meeting generally will be used to augment a user's calendar using the indicators described herein. As a result, participation in any given meeting may become more focused with users being presented with the ability to know which meetings they should or should not attend as well as when and to what extent their participation or activity in the meeting is. Additionally, supervisors and/or team leaders may be made aware just how much any individual's time is used in attending the meetings scheduled. This may allow the supervisor and/or team leaders to know whether any individual should attend the whole meeting or even attend the meeting at all. If, in light of the indicators, a user does not attend any given meeting per a calendar event, a supervisor, peer, and/or team leader may provide the user not attending a synopsis of the meeting as it was conducted. This frees up an amount of time for the user to complete tasks during the day rather than attend meetings.

Figure 2:
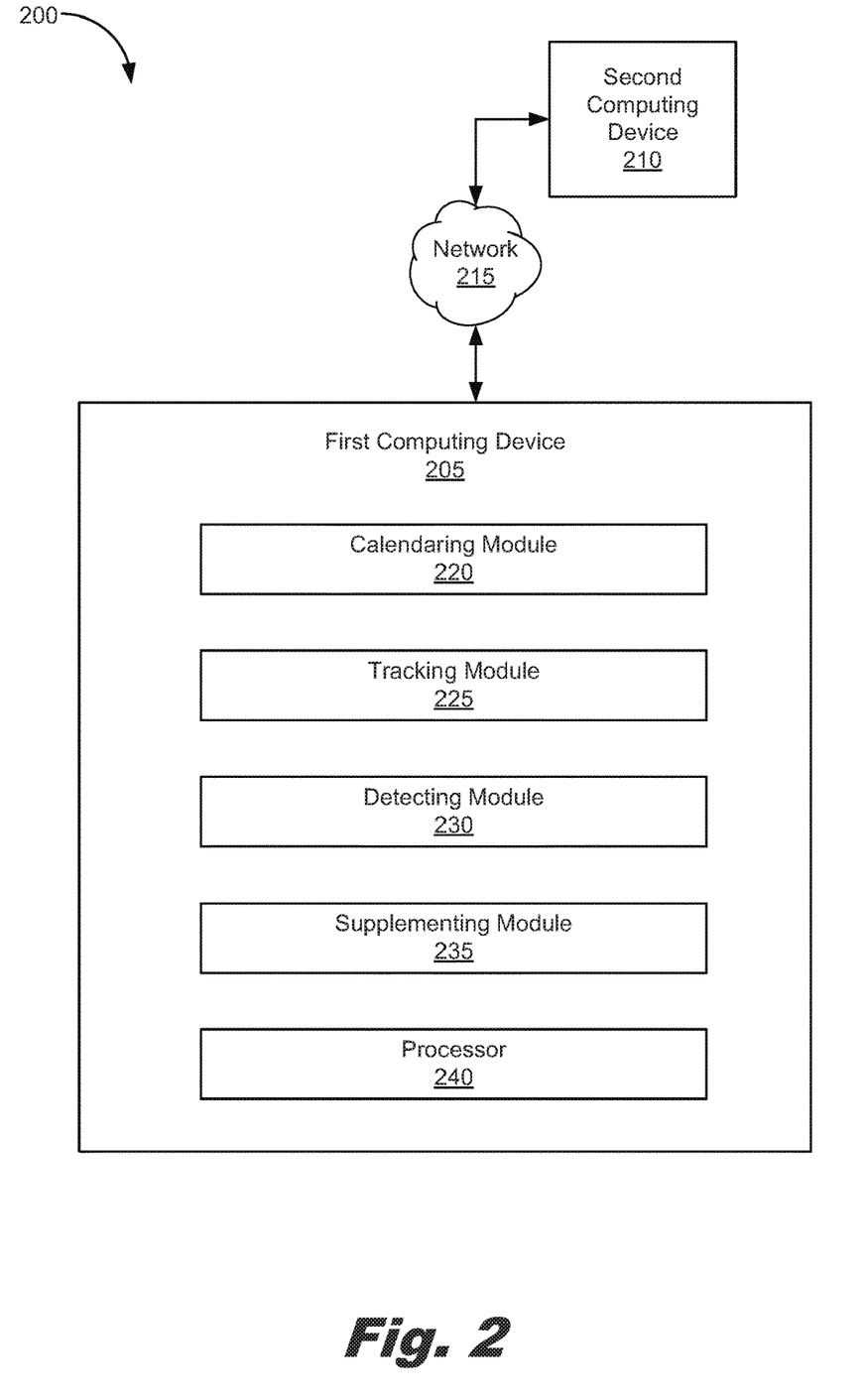
FIG. 2 is a block diagram of a participation analyzing system according to an example of the principles described herein.

FIG. 2 is a block diagram of a participation analyzing system (200) according to an example of the principles described herein. The participation analyzing system (200) may include a first computing device (205) communicatively coupled to at least a second computing device (210) over a network (215). In an example, the participation analyzing system (200) may include a number of data storage devices, a number of peripheral device adapters, and a number of network adapters. These hardware components may be interconnected through the use of a number of busses and/or network connections. In one example, the processor (240), data storage device, peripheral device adapters, and a network adapter may be communicatively coupled via a bus. The network adapter may provide an interface to other computing devices, including the second computing device (210), within, for example, the network (215), thereby enabling the transmission of data between the first computing device (205) and other devices located within the network (215).

The processor (240) may include the hardware architecture to retrieve executable code from the data storage device and execute the executable code. The executable code may, when executed by the processor (240), cause the processor (240) to implement at least the functionality of receiving, at the first computing device (205), at least one calendar entry associated with a calendar application, the calendar entry comprising data defining a meeting type; tracking a user's activity in the meeting type; detecting at least one related calendar entry related with the received calendar entry, wherein the detected related calendar entry comprises a meeting type related to the meeting type of the received calendar entry; and supplementing the related calendar entry with at least one indicator describing the user's activity in the meeting type based on the tracked user activity, according to the methods of the present specification described herein. In the course of executing code, the processor (240) may receive input from and provide output to a number of the remaining hardware units.

The data storage device may store data such as executable program code that is executed by the processor (240) or other processing device. The data storage device may specifically store computer code representing a number of applications that the processor (240) executes to implement at least the functionality described herein.

The first computing device (205) further comprises a number of modules used in the implementation of the methods and systems described herein. The various modules within the first computing device (205) comprise executable program code that may be executed separately. In this example, the various modules may be stored as separate computer program products. In another example, the various modules within the first computing device (205) may be combined within a number of computer program products; each computer program product comprising a number of the modules.

Specifically, the first computing device (205) may include a calendaring module (220). The calendaring module (220) may, when executed by the processor (240) receive at least one calendar entry. The calendar entry may include any information regarding any type of reminder to the user of the participation analyzing system (200) and the first computing device (205). In context of the present specification, the calendar entry may include information regarding a meeting to be conducted at a time specified by the calendar entry.

Additional information may also be included with the calendar entry including, but not limited to, a list of persons invited to attend the meeting, email addresses of attendees of the meeting, and the type of meeting being conducted. The meeting type may include data describing the meeting. By way of example, the data associated with the meeting type may include user specified titles describing, for example, reoccurring events. Additionally, in an example, the data associated with the meeting type may include the form of communication the meeting is to be conducted: via phone, via videoconference, in person, among other types of communications.

The first computing device (205) may further include a tracking module (225). The tracking module (225) may, when executed by the processor (240), track a user's activity associated with the meeting type. As described, the tracking may be used to predict future activity in a future meeting type. In an example, the user's activity may be tracked by the tracking module (225) may be accomplished using a number of sensors. An example of a sensor may include a voice detecting device that detects either a user's specific voice or voice originating from an individual's microphone. When a user's voice is tracked a microphone may be used. The microphone may detect vocal input and send that input to a voice analyze in order to determine who among a number of users the voice is originating from. This may allow the participation analyzing system (200) to receive data describing the activity of any user who has attended, for example, an in-person conference in a conference room having the microphone and voice analyze therein. In this example, the microphone and voice analyzer may be communicative coupled to, at least, the first computing device (205) and/or any computing device (210) communicatively coupled to the first computing device (205) via the network (215).

In the example where the meeting is conducted via either phone or videoconference, the participation analyzing system (200) may be communicatively coupled to at least the first computing device (205) in order to detect vocal data originating from the first computing device (205). In this example, the user of the first computing device (205) may be the user maintaining calendar events on the calendaring module (220) and, therefore, the user's activity with regards to any meeting type may be determined based, at least, on the vocal input at a microphone associated with the first computing device (205). Similarly, a microphone associated with a telephone network may monitor the user's voice from a specific number and may, via the voice analyzer, provide the vocal data describing when and how long any given user is active in the conversation to the first computing device (205). In this example, the telephonic network may be communicatively coupled to the network (215) of the participation analyzing system (200).

The first computing device (205) may further include a detecting module (230). The detecting module (230) may, when executed by the processor, detect at least one related calendar entry related to the received calendar entry. The user's activity may be defined by the user's attendance to the meeting type, points at which the user speaks during the meeting type, an amount of time spent by the user at the meeting type, or combinations thereof.

In an example, the user's activity in connection with the received calendar entry may be tracked by the tracking module (225) and the activity may be determined as described herein. Additionally, the detecting module (230) detects at least one related calendar entry. As described herein, a related calendar entry may be any calendar entry, a calendar entry describing any meeting type, a calendar entry describing any meeting type and a specific mode of communication in the meeting, among other criteria. Each of the characteristics that render a related calendar entry as being related to the received calendar entry may be user defined and/or defined across a number of computing devices (205, 210) communicatively coupled to one another over the network (210) of the participation analyzing system (200).

When the participation analyzing system (200) detects on, at least, the first computing device (205) a related calendar entry, a supplementing module (235) may associate an indicator with the related calendar entry. Specifically, the supplementing module (235) may, when executed by the processor (240), supplement the related calendar entry with at least one indicator describing the user's activity in the meeting type based on the user's tracked activity. As described herein, the indicators may be any visual indicator provided with the related calendar entry to indicate to a user the historic activity by any of the attendees for that meeting type. In an example, the indicator may identify a level of the user's activity in the calendar entry and related calendar entry. A level of activity may be defined by using threshold limits such as durations of time while speaking in a meeting type, how often a user begins to talk in a meeting type, whether the user attends the meeting at all among other types of activities. Again, the indicator may include a listening indicator describing that the user is historically in attendance to the meeting type but historically does not engage in the meeting type In an example, the data defining the meeting type of the calendar entry may be determined based on a description associated with the received calendar entry. In an example, the data defining the meeting type of the calendar entry may be determined based on a keyword associated with the received calendar entry.

In the examples presented above, the method (100) and participation analyzing system (200) have the ability to learn a specific user's level of engagement or activity in any given meeting by monitoring, via the tracking module (225), a user's attendance to the meeting type, participation within any given meeting type, and any number of times a user engages with others in the meeting type. A user's calendar is then supplemented by adding indicators to related calendar entries that indicate a user's historic activity in that meeting or meeting type. This method (100) may continue to update the indicators based on additional meetings scheduled on the user's calendaring module (220) as well as the activity of the user in those meetings. As the user continues to implement the method (100) and participation analyzing system (200), the indicators may become more refined and reliable for future use in developing the indicators.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
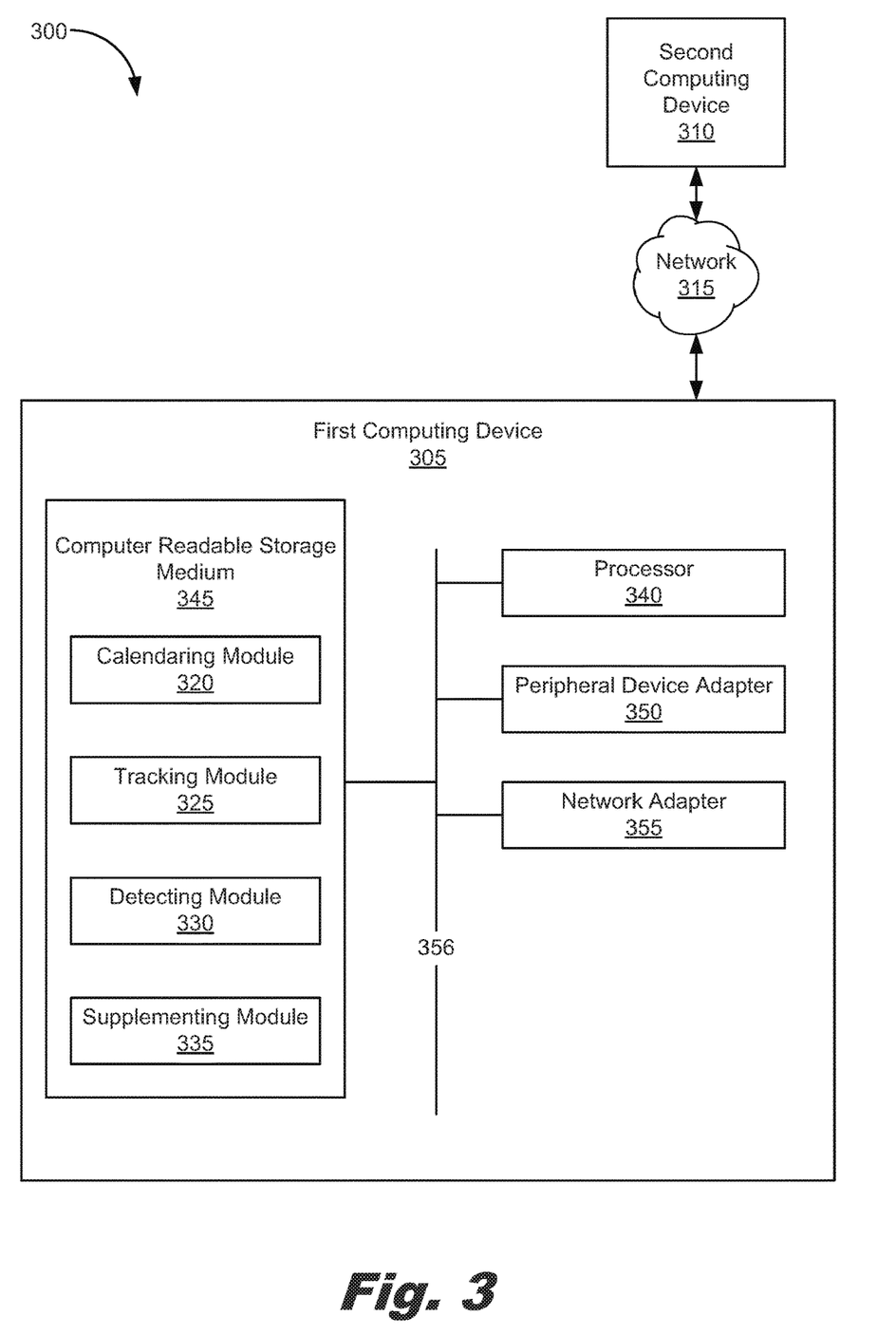
FIG. 3 is a block diagram of a participation analyzing computing device according to an example of the principles described herein.

FIG. 3 is a block diagram of a participation analyzing computing device (300) according to an example of the principles described herein. The participation analyzing computing device (300) may be similar to the first computing device (FIG. 2, 205) described in connection with FIG. 2. The participation analyzing computing device (300) may be communicatively coupled to, at least, a second computing device (310) via a network connection (315).

To achieve its desired functionality, the participation analyzing computing device (300) may include various hardware components. Among these hardware components may be a number of processors (340), a computer readable storage medium (345), a number of peripheral device adapters (350), and a number of network adapters (355). These hardware components may be interconnected through the use of a number of busses and/or network connections. In one example, the processor (340), computer readable storage medium (345), peripheral device adapters (350), and a network adapter (355) may be communicatively coupled via a bus (356).

The processor (340), as described herein, may include the hardware architecture to retrieve executable code from the computer readable storage medium (345) and execute the executable code. The executable code may, when executed by the processor (340) cause the processor (340) to implement at least the functionality of the methods described herein. In the course of executing code, the processor (340) may receive input from and provide output to a number of the remaining hardware units.

The computer readable storage medium (345) may store data such as executable program code that is executed by the processor (340) or other processing device. The computer readable storage medium (345) may specifically store computer code representing a number of applications that the processor (340) executes to implement at least the functionality described herein. Among this computer code may be, at least, the calendaring module (320), the tracking module (325), the detecting module (330), and the supplementing module (335).

The computer readable storage medium (345) may include various types of memory modules, including volatile and nonvolatile memory. For example, the computer readable storage medium (345) of the present example may include Random Access Memory (RAM), Read Only Memory (ROM), and Hard Disk Drive (HDD) memory. Many other types of memory may also be utilized, and the present specification contemplates the use of many varying type(s) of memory in the computer readable storage medium (345) as may suit a particular application of the principles described herein. In certain examples, different types of memory in the computer readable storage medium (345) may be used for different data storage needs. For example, in certain examples the processor (340) may boot from Read Only Memory (ROM), maintain nonvolatile storage in the Hard Disk Drive (HDD) memory, and execute program code stored in Random Access Memory (RAM).

The hardware adapters (350, 355) in the participation analyzing computing device (300) enable the processor (340) to interface with various other hardware elements, external and internal to the participation analyzing computing device (300). For example, the peripheral device adapters (350) may provide an interface to input/output devices, such as, for example, a display device, a mouse, or a keyboard. The peripheral device adapters (350) may also provide access to other external devices such as an external storage device, a number of network devices such as, for example, servers, switches, and routers, client devices, other types of computing devices, and combinations thereof.

The display device may be provided to allow a user of the participation analyzing computing device (300) to interact with and implement the functionality of the participation analyzing computing device (300) as described herein. The peripheral device adapters (350) may also create an interface between the processor (340) and the display device, a printer, or other media output devices. The network adapter (355) may provide an interface to other computing devices within, for example, a network (315), thereby enabling the transmission of data between the participation analyzing computing device (300) and other devices located within the network.

In conclusion, the specification and figures describe a computer-implemented method for analyzing calendar entries and a participation analyzing system. By operation the system and methods described herein a user may understand which meetings and/or parts of meetings a person historically is active in. This may increase a likelihood of a user actually attending meetings or portions of the meetings for reasons discovered via the methods described herein. Additionally, through operation of the system and method, a user may readily determine which meetings the user is most active and which meetings can be avoided based on little if not a lack of participation by the user. This may, consequently, free up time in the user's day to address other tasks assigned to the user. Additionally, other user's may be made aware of the user's historical involvement or activity at any given meeting. The other user's may use this information to either direct the user to not attend or encourage the user to engage more often.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for analyzing calendar entries comprising:
   receiving, at a computing device, at least one calendar entry associated with a calendar application, the calendar entry comprising data defining a meeting type;
   tracking a user's activity in the meeting type;
   detecting at least one related calendar entry related with the received calendar entry, wherein the detected related calendar entry comprises a meeting type related to the meeting type of the received calendar entry; and
   supplementing the related calendar entry with at least one indicator describing the user's activity in the meeting type based on the tracked user activity, wherein the at least one indicator identifies a level of the user's activity in the at least one calendar entry and the at least one detected related calendar entry and wherein the level of the user's activity is presented by color-coordinating portions of the at least one calendar entry and the detected related calendar entry.

2. The method of claim 1, wherein the meeting type is determined based on keywords associated with the received calendar entry.

3. The method of claim 1, wherein the meeting type is determined based on a description associated with the received calendar entry.

4. The method of claim 1, wherein the user's activity is defined by the user's attendance to the meeting type, points at which the user speaks during the meeting type, an amount of time spent by the user at the meeting type, or combinations thereof.

5. The method of claim 1, wherein detecting at least one related calendar entry associated with the received calendar entry comprises comparing a first keyword with a first description associated with the meeting type.

6. The method of claim 1, wherein the at least one indicator comprises a time indicator describing when during the at least one calendar entry and at least one related calendar entry the user is and is not actively engaged in a verbal discussion.

7. The method of claim 1, wherein the at least one indicator comprises a listening indicator describing that the user is historically in attendance to the meeting type but historically does not engage in the meeting type.

8. A participation analyzing system, comprising:
a first computing device communicatively coupled to at least a second computing device over a network, the first computing device comprising:
a calendaring module to, when executed by a processor, receive at least one calendar entry, the calendar entry comprising data defining a meeting type;
a tracking module to, when executed by a processor, track a user's activity associated with the meeting type;
a detecting module to, when executed by a processor, detect at least one related calendar entry related to the received calendar entry; and
a supplementing module to, when executed by a processor, supplement the related calendar entry with at least one indicator describing the user's activity in the meeting type based on the user's tracked activity.

9. The participation analyzing system of claim 8, wherein the meeting type is determined based on a description associated with the received calendar entry.

10. The participation analyzing system of claim 8, wherein the user's activity is defined by the user's attendance to the meeting type, points at which the user speaks during the meeting type, an amount of time spent by the user at the meeting type, or combinations thereof.

11. The participation analyzing system of claim 8, wherein detecting at least one related calendar entry associated with the received calendar entry comprises comparing a first keyword with a first description associated with the meeting type.

12. The participation analyzing system of claim 8, wherein the at least one indicator identifies a level of the user's activity in the at least one calendar entry and the at least one detected related calendar entry.

13. The participation analyzing system of claim 12, wherein the level of the user's activity is presented by color-coordinating portions of the at least one calendar entry and the detected related calendar entry.

14. The participation analyzing system of claim 8, wherein the at least one indicator comprises a listening indicator describing that the user is historically in attendance to the meeting type but historically does not engage in the meeting type.

15. A computer program product for analyzing activity within a meeting, the computer program product comprising a computer readable storage medium having program instructions embodied therewith, the program instructions executable by a processor to cause the processor to:
receive, at a computing device, at least one calendar entry associated with a calendar application, the calendar entry comprising data defining a meeting type;
track a user's activity in the meeting type;
detect at least one related calendar entry related with the received calendar entry, wherein the detected related calendar entry comprises a meeting type related to the meeting type of the received calendar entry and wherein the related calendar entry and received calendar entry share a keyword, and
supplement the related calendar entry with at least one indicator describing the user's activity in the meeting type based on the tracked user activity, wherein the at least one indicator comprises a listening indicator describing that the user is historically in attendance to the meeting type but historically does not engage in the meeting type and wherein the at least one indicator comprises color-coordinating portions of the received calendar entry and the detected related calendar entry.

16. The computer program product of claim 15, wherein the meeting type is determined based on a description associated with the received calendar entry.

17. The computer program product of claim 15, wherein the at least one indicator comprises a time indicator describing when during the at least one calendar entry and at least one related calendar entry the user is and is not actively engaged in a verbal discussion.

* * * * *